United States Patent [19]
Immink et al.

[11] Patent Number: 4,501,000
[45] Date of Patent: Feb. 19, 1985

[54] METHOD OF CODING BINARY DATA

[75] Inventors: Kornelis A. Immink; Jakob G. Nijboer, both of Eindhoven, Netherlands; Hiroshi Ogawa; Kentaro Odaka, both of Tokyo, Japan

[73] Assignee: Sony Corporation, Tokyo, Japan

[21] Appl. No.: 286,982

[22] Filed: Jul. 27, 1981

[51] Int. Cl.³ ............................................. H03K 13/02
[52] U.S. Cl. .................................. 375/25; 375/106; 340/347 DD
[58] Field of Search ............... 375/18, 19, 25, 106, 375/112; 340/347 DD; 360/40, 48; 371/55, 57; 358/13

[56] References Cited

U.S. PATENT DOCUMENTS

| | | | |
|---|---|---|---|
| 3,631,471 | 12/1971 | Griffiths | 340/347 DD |
| 3,810,111 | 5/1974 | Patel | 360/40 |
| 3,995,264 | 11/1976 | Ouchi | 371/55 |
| 4,003,041 | 1/1977 | Van Duuren | 340/347 DD |
| 4,020,282 | 4/1977 | Halpern | 375/34 |
| 4,092,595 | 5/1978 | Weir et al. | 375/17 |
| 4,229,808 | 10/1980 | Hui | 360/48 |
| 4,309,694 | 1/1982 | Henry | 340/347 DD |

Primary Examiner—Robert L. Griffin
Assistant Examiner—Stephen Chin
Attorney, Agent, or Firm—Lewis H. Eslinger; Alvin Sinderbrand

[57] ABSTRACT

A system for block encoding words of a digital signal achieves a maximum of error compaction and ensures reliability of a self-clocking decoder, while minimizing any DC in the encoded signal. Data words of m bits are translated into information blocks of $n_1$ bits ($n_1 > m$) that satisfy a (d,k)-constraint in which at least d "0" bits, but no more than k "0" bits occur between successive "1" bits. The information blocks are catenated by inserting separation blocks of $n_2$ bits therebetween, selected so that the (d,k)-constraint is satisfied over the boundary between any two information words. For each information word, the separation block that will yield the lowest net digital sum value is selected. Then, the encoded signal is modulated as an NRZ-M signal in which a "1" becomes a transition and a "0" becomes an absence of a transition. A unique synchronizing block is inserted periodically. A decoder circuit, using the synchronizing blocks to control its timing, disregards the separation blocks, but detects the information blocks and translates them back into reconstituted data words of m bits. The foregoing technique can be used to advantage in recording digitized music on an optical disc.

13 Claims, 10 Drawing Figures

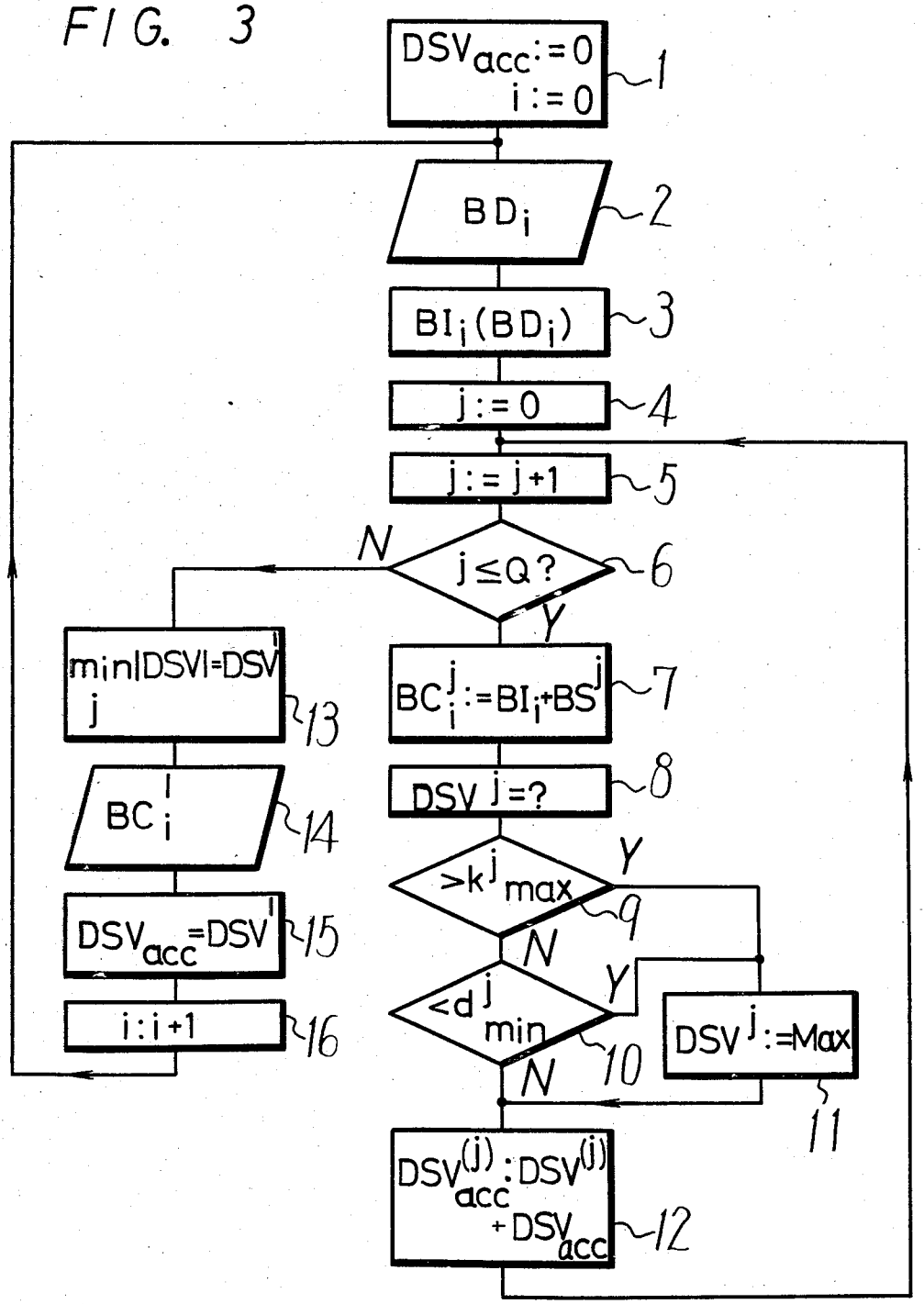

FIG. 5B

METHOD OF CODING BINARY DATA

BACKGROUND OF THE INVENTION

1. Field of the Invention

This invention relates to a system for encoding binary data words into a converted digital code for transmission and thereafter decoding the received digital code into the original binary data words. In particular, this invention relates to a method of encoding words of binary information into encoded information blocks having separation blocks disposed therebetween to minimize the overall DC component of the transmitted digital code. The invention is also directed to apparatus for decoding such a coded signal, and to a record medium carrying information so encoded.

2. Brief Description of the Prior Art

In digital transmission systems and in magnetic and optical recording/playback systems, the information to be transmitted or to be recorded is presented as a sequence of symbols. These symbols collectively form an alphabet, which for binary data is a binary alphabet consisting of the symbols "1" and "0". One symbol, for example the "1", can be recorded in accordance with non-return-to-zero-mark (NRZ-M) code as a transition between two states of magnetization in the case of a magnetic disc or tape, or between two states of intensity or focus in the case of an optical disc. The other symbol, the "0", is recorded by the absence of such a transition.

As discussed in greater detail below, certain system requirements in practice impose constraints on the order in which these symbols may occur.

Some systems are required to be self-clocking. This implies that the sequence of symbols to be transmitted or to be recorded should have sufficient transitions so that a clock signal, which is required for detection and synchronization, can be generated and regulated by the sequence of symbols alone.

A further requirement may be that certain symbol sequences are forbidden in the information signal, as these sequences are intended for special purposes, for example as a synchronizing sequence. If the synchronizing sequence is mimicked by a sequence in the information signal, the information signal destroys the unambiguity of the synchronizing sequence and, consequently, renders the synchronizing sequence unsuitable for its intended purpose.

It may further be required that the transitions not follow too closely after each other in order to limit intersymbol interference.

In the case of magnetic or optical recording, the latter requirement may also be related to the information density on the recording medium. For example, if the predetermined minimum distance between two consecutive transitions on the recording medium, and consequently the minimum time interval ($T_{min}$) corresponding therewith of the signal to be recorded is increased, the information density is increased substantially to the same extent. Also, the required minimum bandwidth ($B_{min}$) correlates to the minimum distance $T_{min}$ between transitions, i.e., $B_{min} = 1/(2T_{min})$.

In addition, the DC component of the sequence of symbols should be kept as close to zero as possible, preferably at zero, because information channels are not normally responsive to direct current and any DC component of the transmitted or recorded signal is likely to be lost.

A method of encoding data to satisfy this requirement is generally discussed in D. T. Tang and L. R. Bahl, "Block Codes for a Class of Constrained Noiseless Channels", *Information and Control*, vol. 17, nr. 5, December 1970, pp. 436–461. Therein are discussed block codes based on so-called (d,k)-constrained q-nary blocks of symbols arranged to satisfy a d-constraint and a k-constraint:

(a) d-constraint—two "1"-type symbols are separated by a run of at least d consecutive symbols of the "0" type; and (b) k-constraint—the maximum length of a run of consecutive symbols of the "0" type is k.

For example, if a stream of binary data is considered as consecutive sequential blocks (or words) each having m data bits, the words can be encoded into corresponding code blocks of n information bits, where $n > m$. Since $n > m$, the number of possible code blocks ($2^n$) far exceeds the number of different data words ($2^m$), and only those code blocks need be used which satisfy the d-constraint and the k-constraint. In other words, if the d- and k-constraints are imposed on the code blocks of n information bits to be transmitted or recorded, the $2^m$ different words map onto a corresponding $2^m$ blocks of information bits out of a total possible number of $2^n$ such blocks. Thus, the mapping of data words into code blocks is carried out so that only those code blocks are used that satisfy the k-constraint and d-constraint.

Table I of Tang and Bahl shows how the number of different code blocks of information bits depends on the length of the block (n) and the requirement imposed on d. For example, if there are eight code blocks of information bits having a length $n = 4$ and minimum distance $d = 1$, and the data words to be encoded have a length $m = 3$, then all the eight ($=2^3$) data words can be represented by the respective eight code blocks of $n = 4$ information bits. In these blocks, two consecutive "1"-type symbols in the blocks of information bits are separated by at least one "0"-type symbol. For this example, the coding is as follows (⟵⟶), where the double-headed arrow indicates mapping of one word onto the corresponding code block and vice versa:

000⟷0000
001⟷0001
010⟷0010
011⟷0100
100⟷0101
101⟷1000
110⟷1001
111⟷1010

When linking-up, or catenating consecutive code blocks of information bits, it is in some cases not possible to satisfy the d-constraint without taking further measures. In Tang and Bahl, it is proposed to include separation bits between the blocks of information bits. In order to satisfy the d-constraint, one block of separation bits comprising d-bits of the "0"-type is sufficient. In the above-mentioned example, where $d = 1$, one separation bit (a single "0") is therefore sufficient. Each three-bit data word is then encoded into a code block of five (4+1) channel bits.

This coding method has the disadvantage that the contribution of the low frequencies (including DC) to the frequency spectrum of the stream of channel bits can be rather high. A further disadvantage is that the construction of the coding converters, i.e., the modulator and demodulator and in particular, the demodulator, becomes rather complex.

In A. M. Patel, "Charge-constrained Byte-oriented (0,3) Code", *I.B.M. Technical Disclosure Bulletin*, Vol. 19, Nr. 7, Dec. 1976, pp. 2715–2717, it has been proposed to limit the direct-current imbalance of (d,k)-constrained codes by linking the code blocks of channel bits by using a so-called inverting link or a so-called non-inverting link, as appropriate. By use of these links, the contributions of a particular code block to the DC imbalance occur so as to offset the DC imbalance of any preceding code blocks, to keep the net DC imbalance at a minimum. However, if this technique is applied to a (d,k)-constrained coding scheme, care must be taken so that the inverting and/or non-inverting links satisfy, rather than conflict with, the d-constraint and the k-constraint when the code blocks are catenated to form a code sequence that also has a minimum DC imbalance. In other words, blocks of separation bits should be selected to satisfy the d- and k-constraints, as aforesaid, and also to reduce the net DC imbalance.

OBJECTS AND SUMMARY OF THE INVENTION

It is an object of the invention to provide a coding scheme for binary data which will produce a code satisfying the above (d,k)-constraints and while keeping the net DC imbalance at a minimum.

It is a more specific object of this invention to provide a coding scheme suitable for use in the recording and playback of digitized audio information.

It is another object of this invention to provide a coding scheme which provides a coded digital signal having improved bandwidth characteristics because low-frequency portions of the signal spectrum are kept small.

It is yet another object of this invention to provide a coded digital signal wherein the minimum distance $T_{min}$ between consecutive transistions is small, so that the minimum bandwidth $B_{min} (=1/2T_{min})$ for the digital signal is also kept small.

It is a further object of this invention to provide a coding scheme in which the bit packing density is maximized without sacrifice of reliability, and which provides a code decodeable in a self-clocking decoder.

According to one aspect of this invention, a method of encoding data for transmission is provided, wherein the original data are considered as words of m bits. The data are converted into channel blocks formed of information bits of $n_1$ serial bits followed by respective separation blocks of a predetermined number of bits, where $n_1 > m$, and in a stream formed of a sequence of such channel blocks, a d-constraint and a k-constraint are satisfied, wherein consecutive bits of one type characterized by a transition are separated by at least d bits of another type characterized by an absence of a transition, while no more than a maximum of k bits of the other type occur between successive bits of the one type. In the method of this invention, the words of m bits are received and converted, or mapped into corresponding information blocks of $n_1$ bits. Next, a set of possible separation blocks for use between successive information blocks is generated so that the information and separation blocks together satisfy the d-constraint and the k-constraint. A superblock is then initially formed which includes a plurality of the successive information blocks catenated with respective possible separation blocks. The total DC imbalance of the initially formed superblock is determined and those possible separation blocks which yield a superblock having the least total DC imbalance are selected. A subsequent superblock is then formed from the initially formed superblock, but excluding therefrom the first information and separation blocks thereof, and from the next successive information block and another of the possible separation blocks. The total DC imbalance for the subsequent superblock is determined. Thereafter, possible separation blocks yielding the least total DC imbalance of the subsequent superblock are selected. Finally, the steps of forming a subsequent superblock, determining the DC imbalance thereof and selecting the separation blocks thereof yielding the least total DC imbalance for the successive information blocks and associated separation blocks are iterated. Preferably, synchronizing sequences are provided periodically in the stream of coded blocks, each formed of two synchronizing blocks which also satisfy the (d,k)-constraints, but which are readily distinguishable from any sequence of bits in the channel blocks.

According to another aspect of this invention, a demodulator is provided for converting the encoded signal back to data words of m bits, comprising a detector for detecting the synchronizing sequences, a separating circuit for processing the channel blocks and separating the information blocks from the separation blocks, and timing circuitry for controlling the timing of the separating circuit in response to the detection of the synchronizing sequence. Then, the separated information blocks are furnished to a converter to be converted therein into the data words of m bits.

According to yet another aspect of this invention, there is provided a record medium, such as an optical disc on which a digitized music signal is recorded. Information structure is recorded thereon comprising a sequence of channel bit cells within which a transition represents a binary digit of one sense and the absence of a transition represents a binary digit of another complementary sense. The distance between any two successive transitions is no greater than a maximum length of (k+1) bit cells, while being no less than a minimum length of (d+1) bit cells. Synchronizing blocks are included at regular intervals on the information structure, each formed of not more than three transitions, consecutive ones of which are separated by a predetermined number of not more than (k+1) bit cells, preferably equal to (k+1) bit cells.

In an embodiment of this invention, by way of example, the data words have a length of eight bits, each block has a length $n_1$ of fourteen information bits, and the separation blocks are formed of three bits. Alternatively, three out of four separation blocks can have a length of two bits, and the fourth can have a length of six bits.

Accordingly, as only 256 words are to be mapped into 16,384 possible information blocks, the (d,k)-constraints can be easily satisfied. Further, catenation of channel blocks formed of the information blocks and the associated separation blocks is achieved while satisfying the (d,k)-constraints and keeping the net DC imbalance at a minimum.

These and other objects, features, and advantages of this invention will become more fully apparent from the ensuing description of preferred embodiments of this invention, when considered with the accompanying drawings.

BRIEF DESCRIPTION OF THE DRAWINGS

FIG. 3 is a flow chart explaining an embodiment of the method according to this invention;

FIG. 5B is a logic table explaining the operation of the demodulator of this embodiment;

DETAILED DESCRIPTION OF THE PREFERRED EMBODIMENTS

Figure 1A:
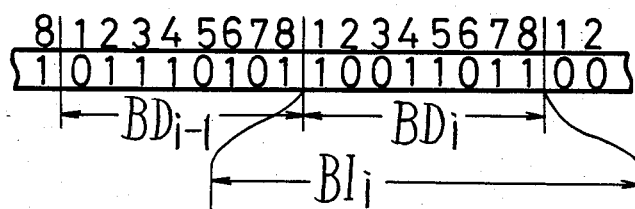
FIGS. 1A and 1B are charts showing illustrative bit sequences for explaining an embodiment of the coding format according to this invention.
Figure 1B:
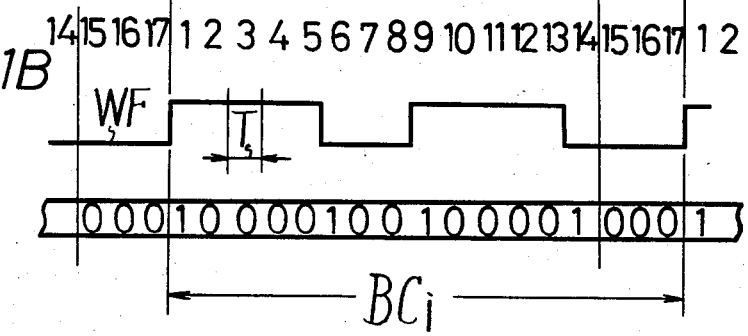

With reference to the drawings, FIGS. 1A and 1B illustrate the general scheme of this invention for encoding words of binary data (FIG. 1A) into a sequence of channel words of binary bits (FIG. 1B). As shown in FIG. 1, the original data are considered as a sequence of eight-bit serial words $BD_{i-1}$, $BD_i$, etc. As shown in FIG. 1B, for each data word $BD_i$ there is generated a corresponding coded channel block $BC_i$ formed of a fourteen-bit information block $BI_i$ followed by a three-bit separation block $BS_i$. In this example, the eight-bit data word $BD_i$ of the form (10011011) is transformed into the information block $BI_i$ having the form (10000100100001). A three-bit separation block $BS_i$ is included, as aforesaid, to ensure that the (d,k)-constraints are not violated, and also is selected such that the DC imbalance of the resulting encoded signal is minimized.

Also, as aforesaid, the "1" data symbols in the coded channel blocks $BC_i$ correspond to a transition occurring at the onset of a bit cell, while the "0" symbols correspond to the absence of such a transition. Consequently, a waveform WF, as shown in FIG. 1B, is provided to be transmitted or to be recorded on a magnetic or optical medium. Each bit cell has an interval duration T.

In general, the data words $BD_i$ consist of m data bits and each such word $BD_i$ corresponds to one of $2^m$ possible bit sequences. Also, in general, if a small d-constraint and a small k-constraint are to be satisfied by an encoded signal, the bit length $n_1$ of the information blocks $BI_i$ must be selected large enough so that there are at least $2^m$ possible combinations of "1" and "0" symbols which will satisfy the (d,k)-constraints Consequently, the information blocks $BI_i$ have a bit length of $n_1$ bits of sufficient size so that there are at least $2^m$ satisfactory combinations of bits which can be utilized for coding. In this example, where m=8 and $n_1$=14, only 256 words need to be selected from a total of more than 16,000 possible information blocks $BI_i$, and the 256 possible 8-bit data words $BD_i$ can be mapped, one-to-one, into a corresponding set of 256 information blocks $BI_i$ satisfying the (d,k)-constraints.

As aforesaid, the (d,k)-constraints require that between two consecutive bits of the "1" type, which correspond to a transition, at least d consecutive information bits of the "0" type which correspond to the absence of a transition, must occur. Also, two consecutive bits of the "1" type are to be separated by not more than a maximum of k bits of the "0" type. It can be shown mathematically that for $n_1$=14, d=2, and k=10, there are 277 possible combinations of bits which will satisfy the (d,k)-constraints. Thus, when encoding words of eight data bits, of which they are $2^8$=256 combinations, the d-constraint and k-constraint can be readily satisfied by using blocks of 14 bits.

The catenation, or linking together, of successive blocks $BI_i$ of information bits is not possible without further measures. This is true because the (d,k)-constraints must be satisfied, not only witin any particular information block $BI_i$, but also over the boundary connecting two such blocks $BI_i$. To this end, separation blocks $BS_i$, each consisting of at least one bit, can be included between two successive information blocks $BI_i$. It can be easily seen that if a sequence of at least d separation bits of the "0" type is used between successive information blocks $BI_i$, then the d-constraint is satisfied. Furthermore, to ensure that the k-constraint is satisfied over the boundary between successive information blocks $BI_i$, the separation block $BS_i$ can include at least one bit of the "1" type in those instances wherein the bit distance between the last "1" of one information block $BI_i$ and the first "1" of the next successive information block $BI_{i+1}$ would otherwise exceed the maximum value k.

In general, the blocks $BS_i$ of separation bits include $n_2$ bits, so that a channel block $BC_i$ consists of $n_1+n_2$ bits. In the example illustrated in FIG. 1B, $n_2$=3.

The above example, wherein m=8, $n_1$=14, and $n_2$=3 will be used throughout the remainder of the description, unless otherwise indicated.

As mentioned previously, the purpose of the d-constraint is to ensure that the transitions (corresponding to "1" bits) do not follow too closely upon one another. Appropriate selection of the value d will lead to achievement of an optimum information packing density. Also, the selection of k at a value which is not too large, in this example, at k=10, permits the encoded signal to be self clocking. This is, if the k-constraint is observed, the timing of the transition of the waveform WF can be used to control the synchronization of a local clock in the decoder.

Generally, it is arbitrary which of the 277 satisfactory information blocks $BI_i$ will correspond to the respective 256 possible data words $BD_i$, the principal consideration being that the encoded signal must be unambiguous.

In addition to ensuring that the (d,k)-constraints are satisfied, the separation blocks $BS_i$ should be selected so that they will act to minimize any direct current imbalance. It should be recognized that for some catenations of information blocks $BI_i$, a unique format for the separation block $BS_i$ is necessary to satisfy the (d,k)-constraints, but for the large majority of such catenations, there are several formats of the separation blocks $BS_i$ which can be used. The number of alternative separation blocks $BS_i$ which can be used in a catenation of successive information blocks $BI_i$ and $BI_{i+1}$ is referred to as the "degree of freedom" of the separation block $BS_i$. This degree of freedom can be used to advantage in minimizing the DC imbalance.

The existence of the DC imbalance can be understood by consideration of the waveform WF representing the encoded signal. The information blocks $BI_i$ as shown in FIG. 1B are transmitted or are recorded on a recording medium, for example in the form of a non-return-to-zero-mark (NRZ-M) format. As aforesaid, with this format a "1" is represented by a transition at the beginning of the relevant bit cell, while a "0" appears as the absence of such a transition. The bit sequence of the catenation of information block $BI_i$ and separation block $BS_i$ has the form of the illustrated waveform WF, and it is this waveform WF which is transmitted or recorded. The waveform WF will have a direct current imbalance to the extent that the positive portions (i.e., those portions following an upward transition) exceed the corresponding negative portions (i.e., those portions following a downward transition). If, for example, the levels of the waveform WF are at values of +1 and −1, the imbalance is then just equal to the running integral of the waveform WF.

The measure commonly used for the DC imbalance is the digital sum value (DSV). In the example of FIG. 1B, the DSV is +6T, where as aforesaid, T is the length of one bit interval.

When such sequences are repeated, the DC imbalance will increase. Generally, the DC imbalance will result in a base line movement, and will reduce the effective signal-to-noise ratio. Consequently, the reliability of the detection of the recorded signals is impaired.

Accordingly, the separation blocks $BS_i$ are selected so as to minimize the DC imbalance. This is achieved generally according to the following scheme. A particular word $BD_i$ of data bits is supplied, and such word $BD_i$ is converted into a block of information bits $BI_i$. This can be done by means of a table stored in a ROM, or can also be achieved by processing the data word $BD_i$ through a battery of logic gates. Thereafter, a set of possible channel blocks $BC_i$ of $(n_1+n_2)$ bits is generated, each such channel block consisting of the information block $BI_i$ and one of the possible separation blocks $BS_i$. In general, there are $2^{n_1}$ possible combinations of "1" and "0" which can be used for the separation block $BS_i$. However, in this case, where a d-constraint (d=2) must be satisfied, and $n_1=3$, only four possible separation blocks need be considered (000, 001, 010, 100). Consequently, in this example, four different channel blocks $BC_i$ are considered. Then, for each of the possible channel blocks. it is determined whether the channel block in catenation with the next adjacent channel block will satisfy the d-constraint and the k-constraint. Thereafter, the DSV for the channel block $BC_i$ is calculated.

For those channel blocks $BC_i$ which satisfy the (d,k)-constraints, that block $BC_i$ is selected which will serve to reduce the cumulative DSV. In principle, it is possible to select that channel $BC_i$ whose DSV is closest to zero. However, it is preferred that that channel block $BC_i$ be selected for which the accumulated DSV of that block $BC_i$ with any preceding channel block $BC_i$ will cause the absolute value of the accumulated DSV to decrease. Then, the selected channel block $BC_i$ is transmitted or recorded.

It should be appreciated that in the method of this invention, the separation bits, which are already included for other purposes, can now also be used rather straightforwardly for limiting or reducing the DC imbalance. Because the method of this invention does not intervene in the transmitted signal, but effects changes only in the separation block $BS_i$ without extending into the information blocks $BI_i$, this method imposes no additional burden on decoding apparatus for receiving the transmitted signal or for playing back the recorded signal. In other words, the demodulation of the played back recorded signal (or the received transmitted signal) only relates to the bits in the information block $BI_i$, and any data patterns occurring in the separation blocks $BS_i$ can be disregarded during decoding or demodulation.

Figure 2A:
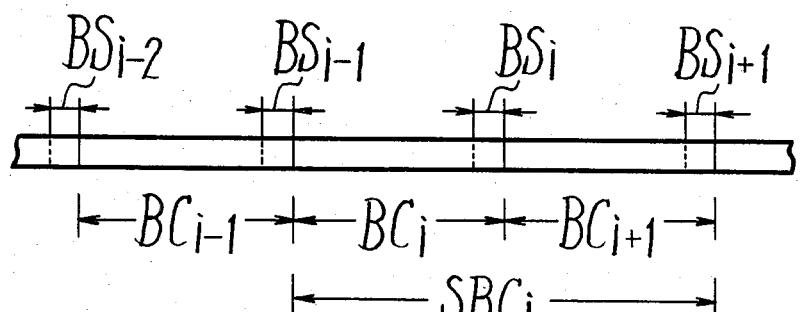
FIGS. 2A and 2B illustrate further bit sequences according to embodiments of the channel coding scheme of this invention, in which direct current imbalance is reduced.
Figure 2B:
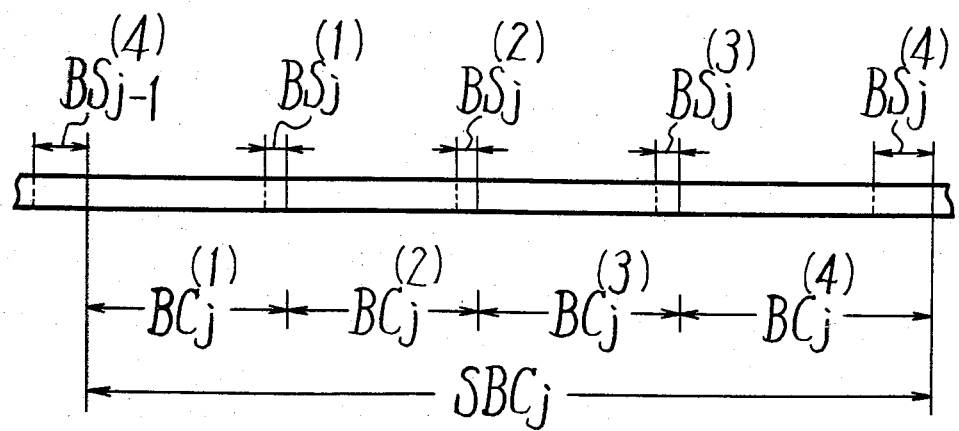

FIGS. 2A and 2B illustrate variations of the signal encoded according to this invention.

FIG. 2A shows, schematically, sequences of channel blocks $BC_{i-1}$, $BC_i$, $BC_{i+1}$, . . . These blocks are each formed of an information block and a respective separation block $BS_{i-2}$, $BS_{i-1}$, $BS_i$, or $BS_{i+1}$. Each information block consists of a predetermined number $n_1$ of information bits, and each separation block $BS_i$ consists of a predetermined number $n_2$ of separation bits. Thus, each channel block consists of $(n_1+n_2)$ bits.

In the encoded signal as illustrated in FIG. 2A, the DC imbalance is determined across several blocks, for example, across a superblock $SBC_i$ formed of two successive channel blocks $BC_i$ and $BC_{i+1}$. The DC imbalance is determined in a manner similar to that described for the embodiment of FIG. 1, except that the possible channel blocks $BC_i$, $BC_{i+1}$ for each superblock $SBC_i$ are all considered in combination with one another to determine which possible separation blocks $BS_i$ and $BS_{i+1}$, each of $n_2$ separation bits are to be used. That combination which minimized the DC imbalance is then selected. This variation has the advantage that the remaining DC imbalance has a rather uniform character, as the separation block $BS_i$ and $BS_{i+1}$ are determined jointly.

An advantageous variant of this method has the distinctive feature that the superblock $SBC_i$ (FIG. 2A) is shifted one channel block only after the DC imbalance has been minimized. This means that each block $BC_i$, which is part of the superblock $SBC_i$, is processed and that the subsequent superblock $SBC_{i+1}$ (not shown) contains the blocks $BC_{i+1}$ and $BC_{i+2}$ (not shown) for which the above-described DC-imbalance-minimizing operation is performed. Thus the block $BC_{i+1}$ forms a part of both the superblocks $SBC_i$ and $SBC_{i+1}$. It is then possible that the initial choice for the separation block $SB_{i+1}$ differs from the ultimate choice thereof as made in the superblock $SBC_{i+1}$. As each separation block is assessed several times (twice in this example), the DC imbalance can be reduced considerably, and the signal-to-noise ratio can be improved markedly.

FIG. 2B shows a further variation in which the DC imbalances determined for a superblock $SBC_j$, which, as shown in FIG. 2B, includes four channel blocks $BC_j^{(1)}$, $BC_j^{(2)}$, $BC_j^{(3)}$, and $BC_j^{(4)}$. Each of these channel blocks includes an information block of $n_1$ information bits as well as a separation block of a predetermined number of bits. However, the number of separation bits in the respective separation blocks $BS_j^{(1)}$, $BS_j^{(2)}$, $BS_j^{(3)}$, and $BS_j^{(4)}$ is not the same for each channel block. In this example, the channel blocks $BC_j^{(1)}$ through $BC_j^{(3)}$ have two bits while the separation block $BS_j^{(4)}$ associated with the final channel block $BC_j^{(4)}$ has six bits. The DC imbalance is determined in a manner similar to that described above for the version of FIG. 2A.

In addition to the advantages already mentioned, which advantages also apply here, the version of FIG. 2B, which includes one relatively long block of separation bits, increases the number of degrees of freedom available within the final separation block $BS_j(4)$, and thereby increases the power of this method for reducing DC imbalance. More specifically, any remaining DC imbalance in a sequence of channel blocks each of which has an equally-long separation block (for example, of 3 bits) will be larger than the remaining DC imbalance for a sequence of channel blocks whose incorporated separation blocks have the same average lengths (here 3 bits), but are divided into different respective bit lengths (i.e., 2 bits, 2 bits, 2 bits, and 6 bits).

It should be apparent that the above-described sequences of functions and the associated steps of the method so described can be readily carried out by means of universally-available sequential logic circuits, for example, commercially available microprocessors with associated ROM's, RAM's, and peripheral circuitry.

FIG. 3 is a flow chart illustrating the general sequence of operations used in carrying out the method of this invention, for example, in a microprocessor.

In step (1), i.e., at the onset of the coding process, the accumulated digital sum value $DSV_{acc}$ associated with any preceding blocks of channel bits in the stream of coded signals, is initialized at a zero value. Also, an index number i associated with the data word $BD_i$ being processed is set at zero.

Then, in step (2), the ith word of m data bits (which had previously been stored in a RAM) is retrieved from its respective storage location.

In step (3) the word $BD_i$ is converted, for example, using a block encoding system, into an information block $BI_i$ consisting of $n_1$ bits. This can be achieved by means of a stored table system, or, possibly, by means of a logic routine. In the simplest form, $2^m$ discrete values are stored in respective addresses in a ROM and are called out by using the $2^m$ bit words as address locations.

In step (4) a parameter j is initialized at a zero value. This parameter j is an index for identifying each of Q discrete channel blocks consisting of the information block $BI_i$ and an associated separation block $BS_j$. As aforementioned, because some possible permutations are forbidden, in this example, whose $n_2=3$ and $d=2$, Q is limited to four.

In step (5) the parameter j is incremented by one.

In step (6), which is a decision step, the value of j is compared with Q. In other words, in step (6) it is determined whether there are any remaining possible channel blocks which have not been considered. If $j \leq Q$, the routine proceeds along the branch Y, but, if $j > Q$, the routine proceeds along the branch N.

If it is determined that $j \leq Q$, the routine proceeds to step (7) and a jth possible channel block $BC^j_j$ is formed by catenating a separation block $BS^j$ with the information block $BI_i$.

Then, in step (8) the digital sum value $DSV^j$ for the jth channel block $BC^j_j$, is calculated.

In step (9), which is a decision block, it is determined whether the block $BC^j_j$. when catenated with any previous channel blocks, satisfies the k-constraint. If the k-constraint is satisfied, the routine proceeds to step (10), but otherwise proceeds to step (11).

In step (10), which is a decision step, the block $BC^j_j$, together with any previous blocks, is considered and it is determined whether the d-constraint is satisfied. If the d-constraint is satisfied, the routine proceeds to step (12), but otherwise, proceeds to step (11).

In step (11), which is reached only if the (d,k)-constraints are unsatisfied, the digital sum value $DSV^j$ for the channel block $BC^j_j$ is changed to an extreme value. This ensures that the associated channel block $BC^j_j$ will not later be selected.

Then, in block (12) the digital sum value $DSV^j$ is added to the accumulated digital sum value $DSV_{acc}$ (which is initially zero) to represent the DC imbalance for any previous channel blocks $BC_i$. The results of this calculation are stored in a memory location associated with the jth channel block $BC^j_j$. Thereafter, the routine returns to step (5) where the value of parameter j is incremented.

After this, steps (6) through (12) are iterated for each possible separation block $BS^j$ until the parameter j reaches a value $j=Q+1$, whereupon the routine proceeds to step (13).

In step (13), it is determined which channel block $BC^j_j$ results in the minimum accumulated digital sum value $DSV_{acc}$, so that the total DC imbalance can be made as small as possible.

Following this, in step (14) the channel block $BC_i$ yielding the lowest digital sum value $DSV_{acc}$ is selected.

Then, in step (15), the accumulated digital sum value $DSV_{acc}$ is stored.

In step (16), the index i is incremented by one ($i=i+1$), and the routine returns to step (2), where the next data word $BD_{i+1}$ is selected and the process is iterated.

While the flow chart of FIG. 3 is readily applicable to the coding scheme illustrated in FIGS. 1A and 1B, it should be apparent that the method of this invention could be modified for encoding according to the variations of FIGS. 2A and 2B, by considering the differences already mentioned above.

In order for a decoder to readily distinguish the information blocks $BI_i$ (which it must decode accurately) from the separation blocks $BS_i$ (which the decoder can disregard) it is preferred to include in the stream of channel bits a unique sequence of synchronizing bits, so that the timing of a decoder can be accurately controlled. A block of synchronizing bits can, for example, be inserted at regular intervals of a predetermined number p of channel blocks $BC_i$. Then, by the detection of the block of synchronizing bits, it can be unambiguously determined which bit position corresponds to the beginning of an information block $BI_i$ and which bit position corresponds to the beginning of a separation block $BS_i$. However, in providing such a block of synchronizing bits, care must be taken to ensure that the synchronization block is truly unique, and is not imitated or mimicked by any bit sequences within the information and separation blocks $BI_i$ and $BS_i$. For this purpose, a unique block of synchronizing bits must be chosen.

However, the synchronizing block should also satisfy the (d,k)-constraints, so as to achieve optimum information density and not to adversely affect the self-clocking properties of the signal. Consequently, the choice of possible bit sequences which will both be unambiguous and will also satisfy the (d,k)-constraints, is quite limited.

In order to provide a satisfactory block of synchronizing bits, it is proposed to use a sequence of bits which occurs at least two times in succession and includes a sequence of s "0" type bits between two consecutive "1" type bits. Preferably, the number s is set equal to k.

Figure 4:
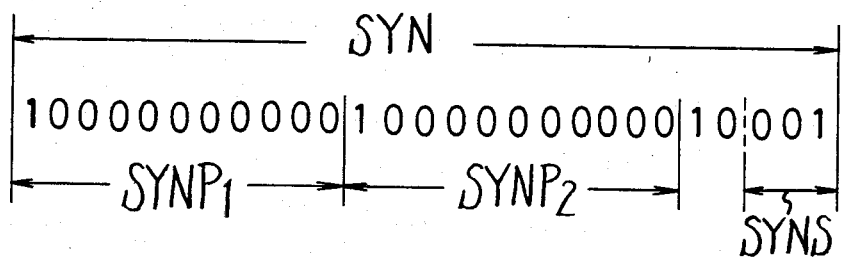
FIG. 4 illustrates a sequence of synchronizing bits for use in the method according to one embodiment of this invention.

FIG. 4 illustrates a synchronizing block SYN of synchronizing bits. This block includes two successive sequences $SYNP_1$ and $SYNP_2$ of a "1" bit followed by ten "0" bits (10000000000). This sequence may also be presented in the channel bit stream, namely for sequences occurring where k is set to ten. However, in order to prevent the sequences (10000000000) from occurring two times in succession other than in the synchronizing block SYN, the step (11) of the routine shown in FIG. 3 can include a subroutine for setting the digital sum value $DSV^j$ to an extreme value if the separation block $BS^j$ would result in a "1" bit being interposed between a "1" bit in a preceding information block $BI_i$ and a "1" bit in a following information block $BI_{i+1}$, while being separated by exactly k "0" bits from both such "1" bits.

An alternative way of preventing imitation would be the use of two successive sequences of a "1" bit followed by eleven "0" bits (100000000000), which violates the k-constraint only by a minimum amount.

In addition, as shown in FIG. 4, the synchronization block SYN also includes a synchronization separation block SYNS formed of a plurality of separation bits. The function of the block SYNS of separation bits is the same as that of the separation blocks $BS_i$ in the channel blocks, namely, to satisfy the (d,k)-constraints and to limit the DC imbalance.

It should be noted that the measures which are taken to prevent the synchronizing pattern from being imitated in the sequence of channel blocks $BC_i$ also prevents the synchronizing sequence $SYNP_1$ from occurring immediately following the separation block SYNS.

It should be remarked that although the encoding method of this invention may seem complex, the system for decoding the signal is relatively simple, as the synchronizing sequences $SYNP_1$ and $SYNP_2$ and the information blocks $BI_i$ only need be considered, while the separation blocks SYNS and $SB_i$ can be disregarded in the decoder. This is true because the method of limiting the DC imbalance is carried out without affecting the information blocks $BI_i$, and because any information carried in the separation blocks $BS_i$ is of no significance during a decoding process. Indeed, the complexity of the decoder is dictated predominantly by the fact that the 256 information blocks $BI_i$ of $n_1$ bits must be transformed back to the corresponding data words of m bits.

In magnetic recording and playback systems, the complexity of the encoding apparatus and of the decoding apparatus are of about equal significance, since, in general, both apparatus are present in a recording system. However, in the case of an optical disc, consumer equipment is constructed for playback, or "read-only" operation, and need only include signal decoding apparatus. Thus, in the case of an optical disc system, a great deal of simplicity can be achieved in consumer equipment at a relatively insignificant increase in complexity of studio or factory equipment.

Figure 5A:
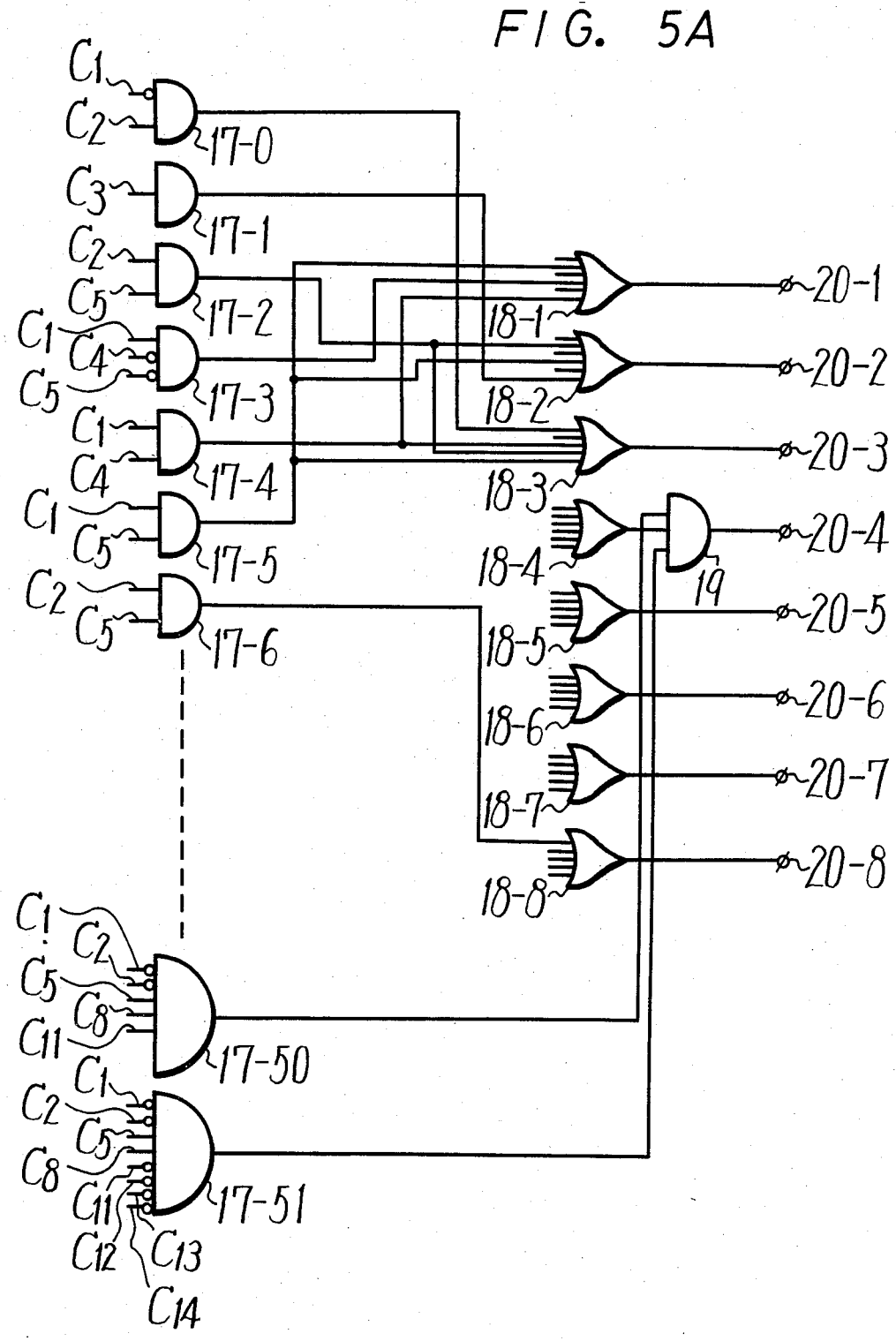
FIG. 5A shows an embodiment of a decoder in accordance with this invention for decoding the data bits which were coded in accordance with the method hereof.
Figure 5B:
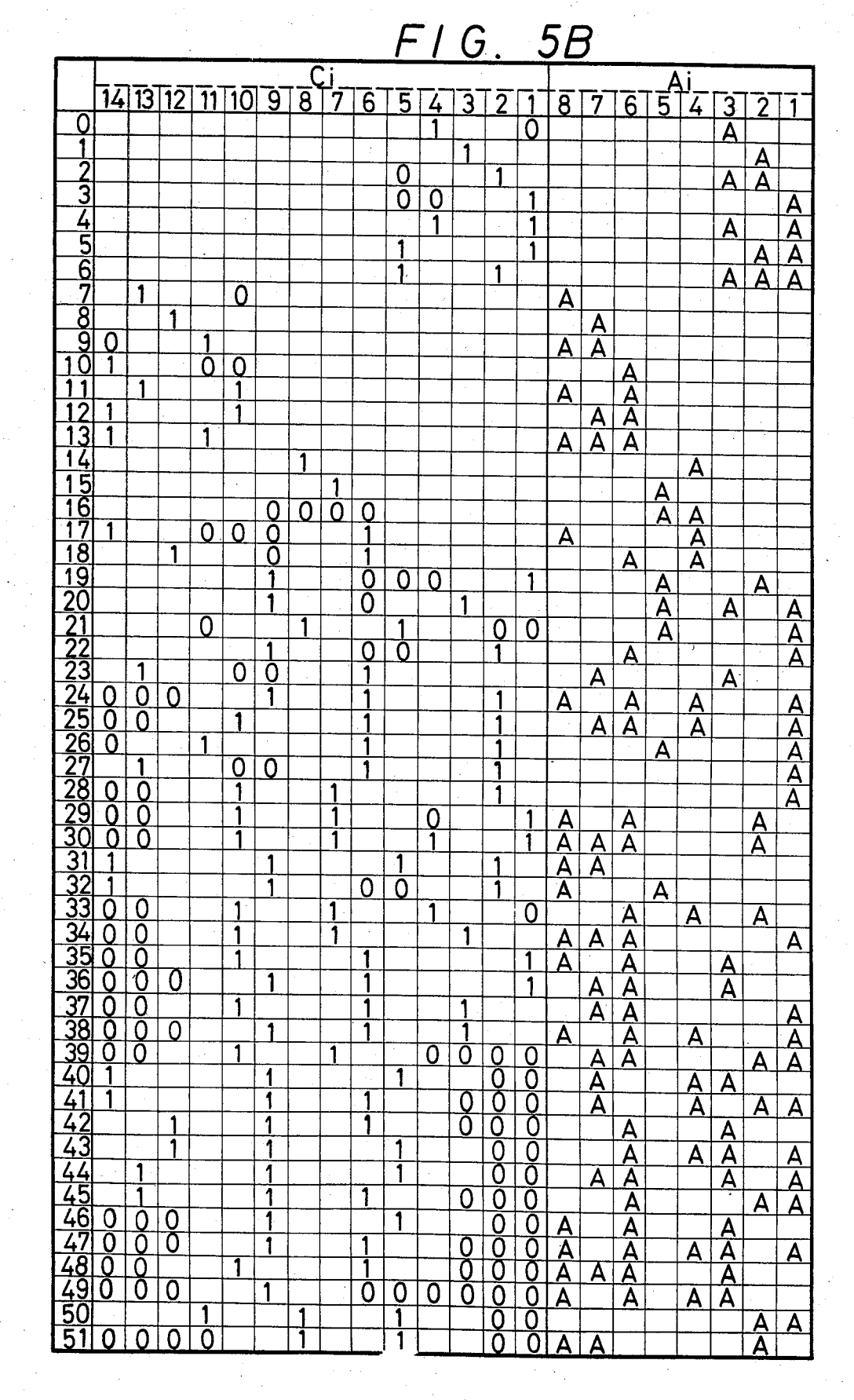

FIGS. 5A and 5B show an embodiment of a demodulator or decoder for transforming the information blocks $BI_i$ of fourteen information bits into data words $BD_i$ of eight data bits. FIG. 5A shows a schematic diagram of the logic circuitry of the decoder, while FIG. 5B is a chart showing the logic input and output connections of the circuitry of FIG. 5A.

As shown in these views, this embodiment of the demodulator includes a battery of AND gates 17-0 to 17-51, each having one or more inputs. One or more of the fourteen bits of the information blocks $BI_i$ is applied to a respective input of each such AND gate 17-0 to 17-51. The inputs thereof are inverting or non-inverting as appropriate as shown in columns $C_i$ of FIG. 5B.

Outputs of the AND gates 17-0 to 17-51 are followed by a battery of OR gates 18-1 to 18-8, each of the latter having a plurality of inputs. The output of each of the AND gates 17-0 to 17-49 are coupled to one or more inputs of the OR gates 18-1 to 18-8. The specific connection or the AND gates 17-0 to 17-49 to the OR gates 18-1 to 18-8 is indicated by the letter A in the columns $A_i$ of FIG. 5B. An AND gate 19 is provided following the OR gate 18-4, and has one input connected thereto, and also has inputs connected respectively to an inverted output of each of the AND gates 17-50 and 17-51. The outputs of the OR gates 18-1 to 18-3, of the AND gate 19, and of the OR gates 18-5 to 18-8 respectively provide bit signal outputs 20-1 to 20-8. Thus, a decoded eight-bit parallel word is provided at the bit signal outputs 20-1 to 20-8, with the output 20-1 providing the most significant bit.

Alternatively, an equivalent demodulator may be provided in the form of a so-called field programmable logic array (FPLA). One example of such an FPLA is the Signetics bipolar FPLA type 82S100/82S101. In this case, the table of FIG. 5B provides the programming table for such an array.

The demodulator of FIG. 5A, is, because of its simplicity, eminently suitable for a playback-only optical recording system, for example, of the type used in a home entertainment system for use in playing digitized music.

Figure 6:
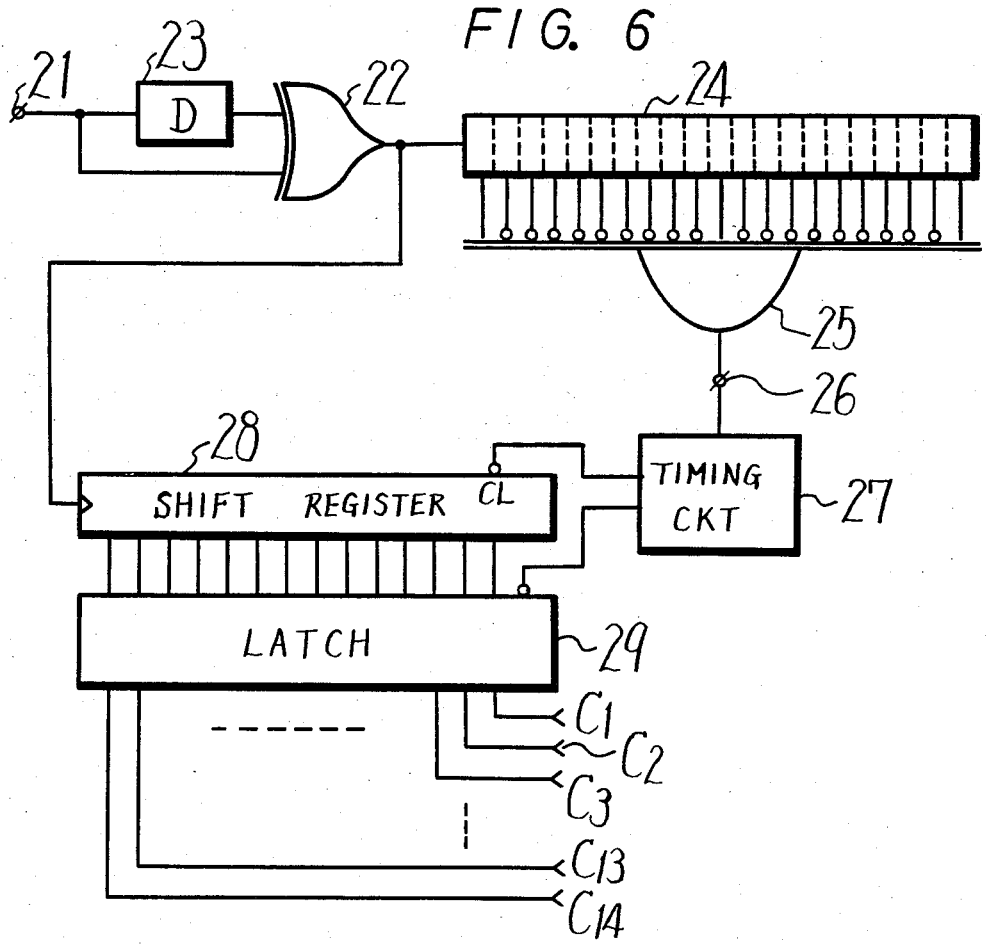
FIG. 6 shows a portion of the decoder provided for detecting a sequence of synchronizing bits.

FIG. 6 shows an arrangement for providing the fourteen bits $C_1$–$C_{14}$ of the information block $BI_i$ from the received or picked-up digital signal.

The transmitted or picked-up recorded signal is applied to an input terminal 21. The signal, which is in the NRZ-M format, is applied directly to a first input of an exclusive-OR gates 22 and also, through a delay line 23, which has a delay time T of one bit cell, to a second input of the exclusive-OR gate 22. A so-called NRZ-I format signal is then provided at the output of the exclusive-OR gate 22 and from there to an input of a shift register 24.

The shift register 24 comprises a plurality of serial sections, each having an output tap. The number of the sections of the register 24 is selected to be equal to the number of bits contained in the two synchronizing sequences $SYNP_1$ and $SYNP_2$. In this embodiment as described above, the shift register must have 23 sections in order to contain the sequence 10000000000100000000001. Each of the taps of the register 23 is connected to a respective input of an AND gate 25, and such inputs are non-inverting for the first, eleventh, and twenty-third taps, but inverting for the remaining taps.

When the synchronizing sequence SYN is present at the inputs of AND-gate 25, a signal will be generated at an output 26 thereof, which signal is used as an indication of the detection of the synchronizing sequence SYN. The signal provided at the terminal 26 then controls the timing of the decoder so that the $n_1$ bits of the information blocks $BI_i$ can be readily separated from the $n_2$ bits of the separation blocks $BS_i$. In this embodiment, when a synchronizing sequence SYN is detected, a pulse is provided from the terminal 26 to an input of a timing circuit 27 to control its operation. The decoder also includes a shift register 28 and an associated latch circuit 29 for providing the fourteen information bits $C_1$–$C_{14}$ of the information blocks $BI_i$.

The NRZ-I signal is provided from the exclusive OR gate 22 to an input of the shift register 28, and a timing signal is provided from the timing circuit to a clear terminal of the shift register 28, and is also provided to a control terminal of the latch circuit 29. The bits of the channel blocks $BC_i$ are shifted, one by one, in the shift register 28. Then, when the 14 bits of the information block $BI_i$ are contained therein, the latch circuit 29 is operated. Then, the fourteen bits $C_1$-$C_{14}$ are provided from outputs of the latch circuit 29 to respective inputs of the AND gates 17-0 to 17-51 of FIG. 5A.

Figure 7:
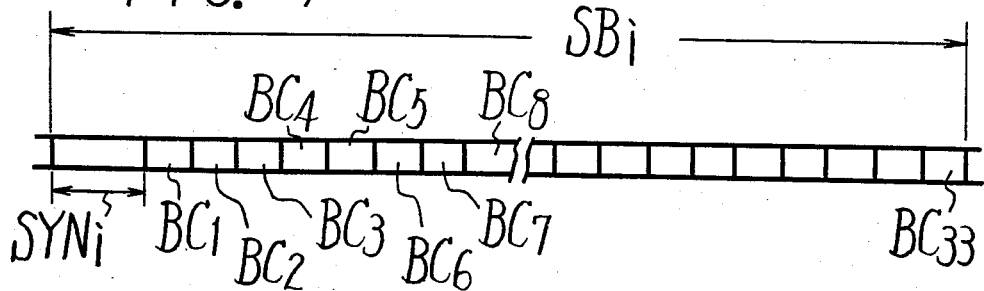
FIG. 7 shows a frame—format of information structure of an encoded signal according to this invention.

If this coded signal is, for example, recorded as a stream of pits and spaces on an optical disc, the signal has the waveform WF of FIG. 1B. Such a signal occurs on the optical disc as a helical information structure. Generally, the information structure includes a sequence of superblocks $SB_i$, for example, as shown in the chart of FIG. 7. Therein, a superblock $SB_i$ comprises a synchronizing block $SYN_i$ of synchronizing bits, of the type shown in detail in FIG. 4. This synchronizing block $SYN_i$ is followed by a plurality (i.e., 33 in this embodiment) of channel blocks $BC_1$-$BC_{33}$, each having $(n_1+n_2)$ bits.

A channel bit of the "1" type is represented by a transition on the recording medium. For example, a "1" bit can be represented by the boundary between a pit and a space. A channel bit of the "0" type is represented on the recording medium by the absence of any transition.

The helical information track is divided into elementary cells, or bit cells. On the recording medium, these bit cells form a spatial structure, and each thereof corresponds to a minimum timewise subdivision, i.e., the period of time corresponding to a single bit, in the stream of channel bits.

Independent of the content of the information contained in a recording medium, such as an optical disc, a number of structural details can be readily distinguished by observation of the medium. For example, because the k-constraint is satisfied, the maximum distance between any two consecutive transitions is $k+1$ bit cells. In other words, in an optical disc, the longest pit has a length of $k+1$ bit cells, and the longest space between two successive pits will also have a length of $k+1$ bit cells. Similarly, because the d-constraint is satisfied, the minimum distance between any two consecutive transitions is $d+1$. In other words, the shortest pit will have the length of $d+1$ bit cells and the smallest space between pits will also have a length of $d+1$ bit cells.

Furthermore, at regular intervals there are provided a pit of the maximum length and an immediately adjacent space also of the maximum length. This structure is, of course, the main feature of the synchronizing sequence SYN.

In the preferred embodiment, the parameters k, d, $n_2$, $n_2$ are selected to be 10, 2, 14, and 3, respectively. Thus, a superblock $SB_i$ spans a total of 588 bit cells. The superblock $SB_i$ includes a synchronization block of 27 bit cells, and 33 channel blocks, each comprising 17 bit cells so that the information structure includes frames of 561 bit cells separated by the synchronizing blocks of 27 bit cells.

A modulator, a tranmission channel (such as an optical record disc), and a demodulator may together comprise a part of a system for the conversion of analog audio information (e.g., music or speech) into digital information to be recorded or stored. Then, the recorded information, or a replica of it, can be played back as analog information, on an arrangement suitable for the type of recorded information.

The conversion circuit can favorable comprise an analog-to-digital converter for converting the analog signal (i.e., musch or speech) into a digital signal of a predetermined format. In addition, the conversation circuit can include an error-correcting encoder. In a corresponding playback conversion circuit, digital errors, especially of the type which occur during reading of the playback information, are easily corrected. Suitable arrangements for such error-correction encoding and decoding are disclosed, for example, in patent application Ser. No. 06/265,465, filed May 20, 1981 (now abandoned), and having a common assignee herewith.

The digital, error-protected signal is thereafter applied to encoding system of this invention for conversion to a digital signal adapted for recording and playback. The synchronization pattern is inserted and the signal is placed into a suitable frame format. Then, the signal is used to generate a suitable signal (i.e., an NRZ-format signal) to control a laser, and the signal is recorded by the laser onto a rotating photo sensitive disc as a sequence of pits and spaces.

The recording medium or a replica thereof can be played on optical playback apparatus to derive the NRZ-M signal, and the information data are derived from such signal. For this purpose, the playback arrangement includes a decoder, as described in detail herein, an error correction decoder, and a digital-to-analog converter for reconstituting a replica of the original analog signal.

Having described specific preferred embodiments of this invention with reference to the accompanying drawings, it is to be understood that the invention is not limited to those precise embodiments, and various changes and modifications may be effected therein by one skilled in the art without departing from the scope or spirit of this invention as defined in the appended claims.

What is claimed is:

1. A method of encoding a binary digital signal, comprised of words of m bits, into a sequence of channel blocks each formed of an information block of $n_1$ serial bits followed by a separation block of a predetermined number of bits, where $n_1$ is greater than m, wherein, in a stream of such channel blocks, a d-constraint is satisfied such that consecutive bits of one type characterized by a transition are separated by at least d bits of another type characterized by an absence of a transition, and a k-constraint is satisfied such that no more than a maximum of k bits of the other type occur between successive bits of the one type, comprising the steps of:

receiving each word of m bits;

converting each such word into a corresponding information block of $n_1$ bits;

generating a set of possible separation blocks for use between successive information blocks so that said information and separation blocks together satisfy said d-constraint and said k-constraint;

initially forming a superblock of a plurality of successive information blocks catenated with respective possible separation blocks, said superblock having a first information block therein;

determining the total DC imbalance for such initially formed superblock of said plurality of successive information words catenated with said respective possible separation blocks;

selecting for said initially formed superblock those possible separation blocks yielding the least total DC imbalance;

forming a subsequent superblock from said initially formed superblock, but excluding therefrom the first information block and separation block thereof, and from the next successive information block and another of said possible separation blocks;

determining the total DC imabalance for such subsequent superblock;

selecting those possible separation blocks yielding the least total imbalance for said subsequent superblock; and iterating the steps of forming a subsequent superblock, determining the DC imalance thereof and selecting the separation blocks therefor yielding the least total DC imbalance for the successive information blocks and associated separation blocks.

2. A method of encoding a binary digital signal according to claim 1, wherein said step of catenating is followed by checking whether the bits in the respective separation blocks satisfy both said k-constraint and said d-constraint both with respect to its associated information block and with any neighboring information blocks adjacent thereto; and thereafter, if said constraints are both satisfied, permitting said determined DC imbalance for said catenation to stand, but otherwise setting said determined DC imbalance to an extreme value so that the associated separation block will not be selected.

3. A method of encoding a binary digital signal according to claim 1, wherein each said stream is formed of a sequence of p successive channel blocks, and said method further includes inserting a block of synchronization bits between the pth channel block of one such sequence and the first channel block of the subsequent sequence.

4. A method of encoding a binary digital signal according to claim 3, wherein said synchronization block is formed of at least two successive subblocks of $n_3$ synchronization information bits, and a synchronization separation block of $n_4$ bits.

5. A method of encoding a binary digital signal according to claim 4, wherein said synchronization separation block is formed by determining the total DC imbalance, for each of a plurality of possible synchronization separation blocks, of said separation block, said synchronization subblocks, and any previously-formed channel blocks in said stream, and selecting the synchronization separation block yielding the least total imbalance.

6. A method of encoding a binary digital signal according to claim 4, wherein each said sequence of subblocks of synchronization bits is selected so as to be distinguishable from any series of bits within the stream of channel blocks, while satisfying said k-constraint and said d-constraint.

7. A method of encoding a binary digital signal according to claim 6, wherein said subblocks of synchronization bits each includes a bit of said one type followed by s bits of said other type.

8. A method of encoding a binary digital signal according to claim 7, wherein $s=k$.

9. A method of encoding a binary digital signal according to claim 1, wherein said stream comprises groups of four channel blocks, with three of the four blocks having associated therewith a separation block of $n_2$ bits and the fourth thereof having associated therewith a separation block of $n_2'$ bits, with $n_2' > n_2$.

10. A method of encoding a binary digital signal according to claim 9, wherein $m=8$, $n_1=14$, $n_2=2$, and $n_2'=6$.

11. A method of encoding a binary digital signal according to claim 1, wherein $m=8$, $n_1=14$, and the predetermined number of bits in said separation blocks is 3.

12. A decoder for decoding an encoded digital signal which is formed of a sequence of channel blocks each formed of an information block of $n_1$ serial bits followed by a separation block of a predetermined number of bits, where each information block represents a word of m bits, with $n_1 > m$, wherein in a stream of such channel blocks, d-constraint is satisfied such that consecutive bits of one type characterized by a transition are separated by at least d bits of another type characterized by an absence of a transition, and a k-constraint is satisfied such that no more than a maxiaum of k bits of the other type occur between successive bits of the one type, and in which a synchronizing block is included formed of a pattern of bits satisfying both said k-constraint and said d-constraint and which is distinctive from any pattern of bit occurring in the sequence of channel blocks; comprising detecting means for detecting said synchronizing blocks;

separating means for separating the $n_1$ bits of the information block from the separation block in each said channel block;

means controlling the timing of the separating means in response to the detection of said synchronizing block; and converting means for converting each information block of $n_1$ bits into a word of m bits including a battery of AND gates, each having an output and one or more inputs to receive the bits from at least one predetermined bit position of the information block, such bits being applied in parallel thereto, a battery of OR gates each having an output and one or more inputs coupled to respective outputs of selected ones of said AND gates, and output means coupled to the outputs of said OR gates to provide, in parallel, said m bits of the decoded digital signal, said output means including at least one further logic gate having an output, at least one input coupled to the output of one of said AND gates and at least one input coupled to the output of at least one of said OR gates.

13. A data conversion circuit comprising a decoder for decoding an encoded digital signal which is formed of a sequence of channel blocks each formed of an information block of $n_1$ serial bits followed by a separation block of a predetermined number of bits, where each information block represents a word of m bits, with $n_1$ greater than m, wherein in a stream of such channel blocks, a d-constraint is satisfied such that consecutive bits of one type characterized by a transition are separated by at least d bits of another type characterized by an absence of a transition, and a k-constraint is satisfied such that no more than a maximum of k bits of the other type occur between successive bits of the one type, and in which a synchronizing block is included formed of a pattern of bits satisfying both said k-constraint and said d-constraint and which is distinctive from any pattern of bits occurring in the sequence of channel blocks; comprising:

detecting means for detecting said synchronizing blocks;

separating means for separating the $n_1$ bits of the information block from the separation block in each said channel block;

means controlling the timing of the separating means in response to the detection of said synchronizing block; and converting means for converting each information block of $n_1$ bits into a word of m bits including a battery of AND gates, each having an output and one or more inputs to receive the bits from at least one predetermined bit position of the information block, such bits being applied in parallel thereto, a battery of OR gates each having an output and one or more inputs coupled to respective outputs of selected ones of said AND gates, and output means coupled to the outputs of said OR gates to provide, in parallel, said m bits of the decoded digital signal, said output means including at least one further logic gate having an output, at least one input coupled to the output of one of said AND gates and at least one input coupled to the output of at least one of said OR gates.

* * * * *